(12) United States Patent
Rippl

(10) Patent No.: US 7,906,744 B2
(45) Date of Patent: Mar. 15, 2011

(54) METHOD AND DEVICE FOR THE LASER MACHINING OF WORKPIECES

(75) Inventor: Peter Rippl, Augsburg (DE)

(73) Assignee: Kuka Systems GmbH, Augsburg (DE)

( * ) Notice: Subject to any disclaimer, the term of this patent is extended or adjusted under 35 U.S.C. 154(b) by 1100 days.

(21) Appl. No.: 10/565,332

(22) PCT Filed: Jul. 20, 2004

(86) PCT No.: PCT/EP2004/008104

§ 371 (c)(1),
(2), (4) Date: Jan. 19, 2006

(87) PCT Pub. No.: WO2005/009667

PCT Pub. Date: Feb. 3, 2005

(65) Prior Publication Data

US 2006/0175301 A1    Aug. 10, 2006

(30) Foreign Application Priority Data

Jul. 22, 2003 (DE) .................. 103 33 456

(51) Int. Cl.
*B23K 26/02* (2006.01)
*B23K 26/00* (2006.01)

(52) U.S. Cl. ......... 219/121.78; 219/121.63; 219/121.64; 219/121.79

(58) Field of Classification Search ............ 901/20; 219/121.63, 6, 78, 64, 121.78
See application file for complete search history.

(56) References Cited

U.S. PATENT DOCUMENTS

| 4,539,462 | A | * | 9/1985 | Plankenhorn | 219/121.79 |
| 4,567,347 | A | * | 1/1986 | Ito et al. | 219/124.34 |
| 4,578,554 | A | * | 3/1986 | Coulter | 219/121.63 |
| 4,638,143 | A | * | 1/1987 | Akeel | 219/121.74 |
| 4,798,321 | A | * | 1/1989 | Moran | 228/213 |
| 4,855,565 | A |   | 8/1989 | Thomas et al. |   |

(Continued)

FOREIGN PATENT DOCUMENTS

DE        196 04 205        8/1997

(Continued)

*Primary Examiner* — Quang T Van
*Assistant Examiner* — Hung Nguyen
(74) *Attorney, Agent, or Firm* — McGlew & Tuttle, P.C.; John James McGlew

(57) ABSTRACT

A method for machining workpieces (6) uses a moving laser beam (4), whereby the laser tool (3) is held at a separation above the workpiece (6) by means of a multi-axis mechanical manipulator (2) with a manipulator hand (8) and moved along a given track in an offset movement. During the machining process an at least partly opposing compensation movement of the laser beam (4) is superimposed on the offset movement. A device is provided for machining workpieces (6) with a moving laser beam (4). The laser tool (3) is held by means of a multi-axis mechanical manipulator (2) and a device for generation of a opposing compensation movement of the laser beam (4) is superimposed on the offset movement.

23 Claims, 8 Drawing Sheets

U.S. PATENT DOCUMENTS

| | | | |
|---|---|---|---|
| 5,132,887 A * | 7/1992 | Torii et al. | 362/259 |
| 5,140,129 A * | 8/1992 | Torii et al. | 219/121.78 |
| 5,564,312 A * | 10/1996 | Brunman et al. | 74/490.02 |
| 5,590,034 A * | 12/1996 | Snell | 700/61 |
| 5,610,758 A * | 3/1997 | Sumi | 359/319 |
| 5,948,287 A * | 9/1999 | Bandelin et al. | 219/121.64 |
| 6,070,109 A * | 5/2000 | McGee et al. | 700/259 |
| 6,072,149 A * | 6/2000 | Maruyama et al. | 219/121.63 |
| 6,127,647 A * | 10/2000 | Matsuo et al. | 219/121.63 |
| 7,560,659 B2 * | 7/2009 | Menin | 219/121.64 |
| 2003/0171847 A1 * | 9/2003 | Cheng et al. | 700/245 |
| 2005/0150876 A1 * | 7/2005 | Menin et al. | 219/121.63 |
| 2006/0157455 A1 * | 7/2006 | Kawai | 219/121.63 |

FOREIGN PATENT DOCUMENTS

| | | |
|---|---|---|
| DE | 101 27 743 | 1/2002 |
| EP | 0 631 838 | 1/1995 |
| JP | 04238688 | 8/1992 |
| JP | 07256478 A * | 10/1995 |
| WO | WO 02/02281 | 1/2002 |

* cited by examiner

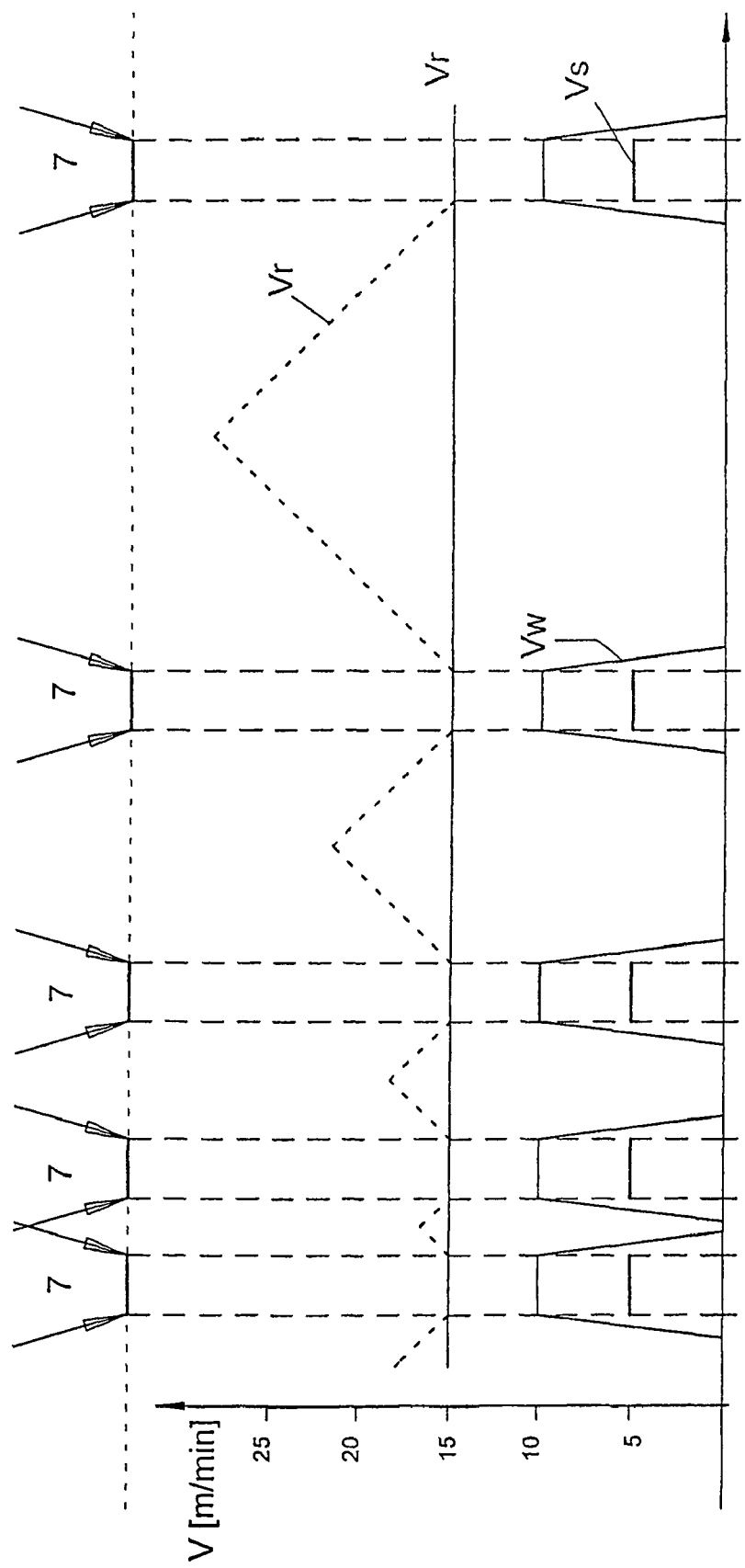

METHOD AND DEVICE FOR THE LASER MACHINING OF WORKPIECES

CROSS REFERENCE TO RELATED APPLICATIONS

This application is a United States National Phase application of International Application PCT/EP2004/008104 filed Jul. 20, 2004 and claims the benefit of priority under 35 U.S.C. §119 of German Patent Application DE 103 33 456.4 filed Jul. 22, 2003, the entire contents of which are incorporated herein by reference.

FIELD OF THE INVENTION

The present invention pertains to a process and a device for the laser machining of workpieces

BACKGROUND OF THE INVENTION

It is known from practice that different types of machining of a workpiece, e.g., welding, cutting, engraving, heating or the like, can be carried out with a laser tool. The laser tools are moved in relation to the workpiece by means of multiaxial mechanical manipulators, e.g., compound tables, multiaxial articulated-arm robots or the like. During laser welding, the laser tool is usually guided by means of a pressing element in contact with and at a constant distance from the workpiece. Focusing optical systems with fixed and relatively short focal distances may be used here. Furthermore, laser remote welding, in which a laser with fixed and longer focal distance is guided by a multiaxial manipulator at a greater distance in relation to the workpiece, is known in practice. In addition, it is known in remote welding that the laser tool may be equipped with a scanning means, which deflects the laser beam and moves it in relation to the workpiece.

The process velocity of the laser beam at the workpiece, e.g., the velocity of welding, is limited in the above-mentioned laser machining operations. It is approx. 4-6 m/minute in case of YAG or $CO_2$ lasers. Higher velocities of up to approx. 10 m/minute can be reached at present with fiber lasers or disk lasers. The velocity of displacement, with which the manipulator moves the laser tool along a predetermined path during machining, e.g., during laser welding, corresponds to the above-mentioned machining velocity. If machining operations are carried out stroke by stroke, e.g., during stitch seam welding, the manipulator can be moved faster during the transport phases between the welding operations. In most machining operations, e.g., laser welding, it is desirable to place as many weld seams as possible in the shortest possible time. However, these efforts are limited by the relatively low velocity of welding, especially because the manipulator must perform acceleration and deceleration operations with its axes during the transport phases and the velocity level is also limited hereby. Moreover, such acceleration and deceleration operations lead to higher mechanical loads on the manipulator.

SUMMARY OF THE INVENTION

The object of the present invention is to provide a better and higher-performance laser machining technique.

According to the invention, a process for machining workpieces is provided with a moving laser beam. The laser beam is held by a multiaxial mechanical manipulator at a manipulator hand at a spaced location above the workpiece and moved along a predetermined path during a displacing motion. At least partially oppositely directed compensating motion of the laser beam is superimposed to the displacing motion during the machining operation.

The superimposition of the leading displacing motion and a compensating motion of the laser beam, which is in the opposite direction, has the advantage that the overall velocity level of the manipulator can be increased without the permissible machining velocity on the workpiece being exceeded. Due to the increase in output, more machining operations can be carried out in a shorter time than before. This has special advantages in case of laser welding and especially in case of stitch seams.

In particular, it is possible with the laser machining technique being claimed to join body parts by means of seam stitches especially rapidly and with high and settable strength or dimensional stability and to quasi "sew" a body similarly to a piece of clothing. This may happen both in case of geometry welding and deposit welding, in which both welding operations can take place in the same station and can pass over into one another. The separation into geometry welding or tacking in a framing station and a subsequent respot welding in downstream stations, which separation is common in spot welding, is no longer necessary, but it may nevertheless take place when desired.

Another advantage is the possibility of making the displacing motions uniform. If the velocity of displacement is sufficiently high, the displacing motion may be essentially continuous, which relieves the manipulator. However, it is nevertheless possible here to increase the velocity during the transport phases in order to further increase the output.

The compensating motion is performed in one variant by means of a pivoting motion of the manipulator hand about one of its hand axes. Such a motion can be carried out rapidly and controlled very accurately, and this hand axis is preferably independent and can be controlled independently from the displacing motion of the other manipulator axes. The motion of a hand axis motion (along a hand axis) and especially along an axis located as far away on the driven side as possible has the further advantage that the masses involved can be kept low, which permits a low-inertia compensating motion.

The laser tool may be mounted by means of an extension arm or according to another suitable technique at a spaced location from or at an angular position in relation to the manipulator hand and the hand axis that is acted on for the compensating motion. Due to the increase in distance, small angles of rotation of the hand axis are sufficient to obtain great compensating motions and compensation paths. The transmission ratio or the leverage can be changed by changing the distance. The laser tool may have a short and preferably fixed focal distance depending on the type of the extension arm. This has advantages in terms of the focus tolerance and the broad selection of laser systems that can be used. As an alternative, it is possible to use laser optical systems with a long focal distance.

A scanning means is used to deflect the laser beam in the other variant. Even though this scanning means entails a greater design effort and higher costs than the variant described above, it offers the same technological advantages.

During a compensating pivoting motion, the laser beam is directed obliquely toward the workpiece in such a way that it gets ahead of the laser tool and the displacing motion at the beginning of the machining operation, especially at the beginning of the weld seam to be welded. Such a beam angle of, e.g., 15°, deviating from the normally perpendicular beam direction, has advantages during the entry of the laser beam into the workpiece. The direction of the beam changes in the course of the compensating motion over the perpendicular incidence angle up to an obliquely rearwardly directed beam angle, which in turn has advantages at the end of the seam.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 4 is a velocity diagram for the displacement velocity, the compensating velocity and the welding velocity;

DESCRIPTION OF THE PREFERRED EMBODIMENT

Figure 1:
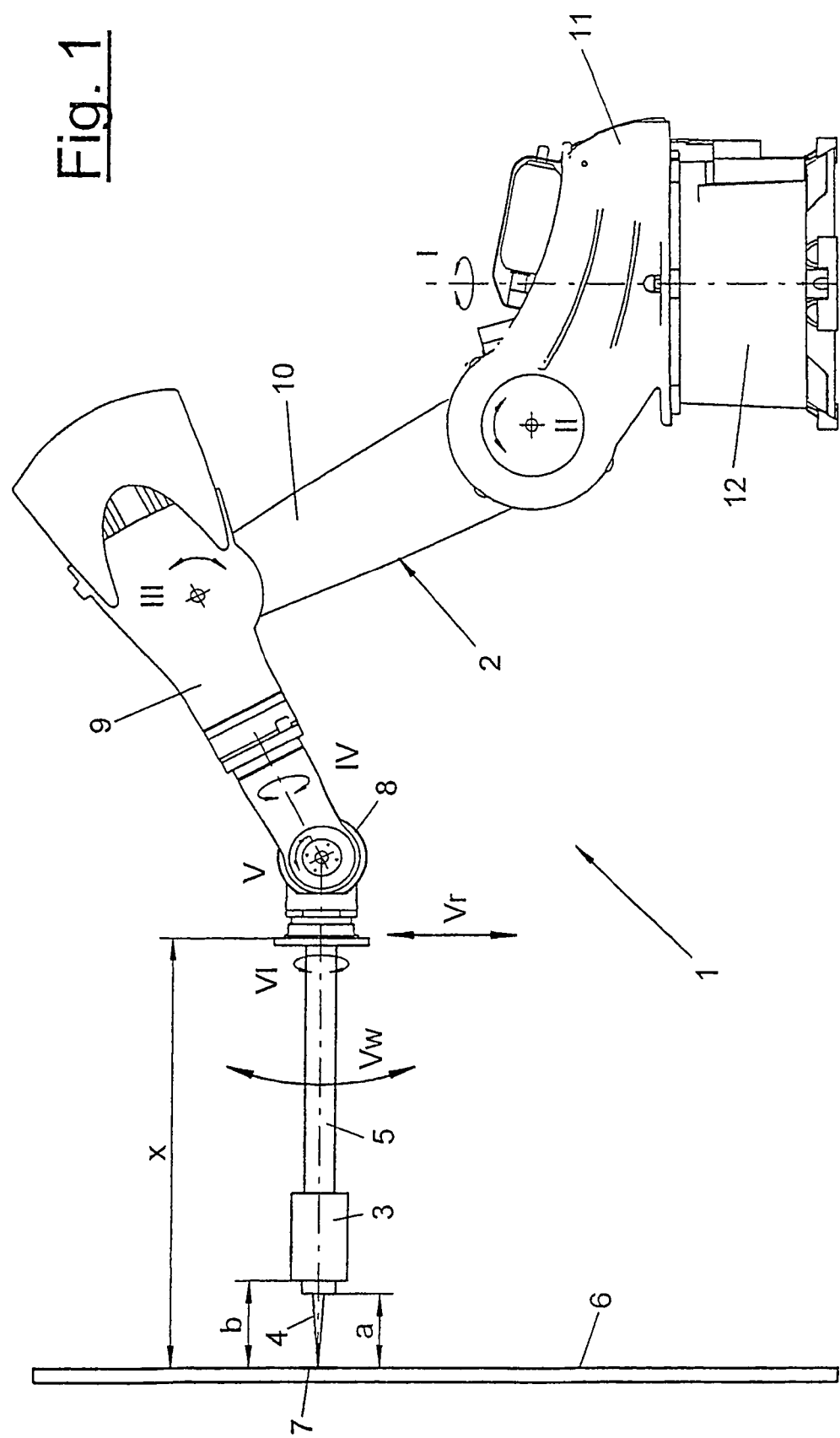
FIG. 1 is a side view of a laser machining device with a multiaxial robot, an extension arm and a laser tool at a workpiece.
Figure 8:
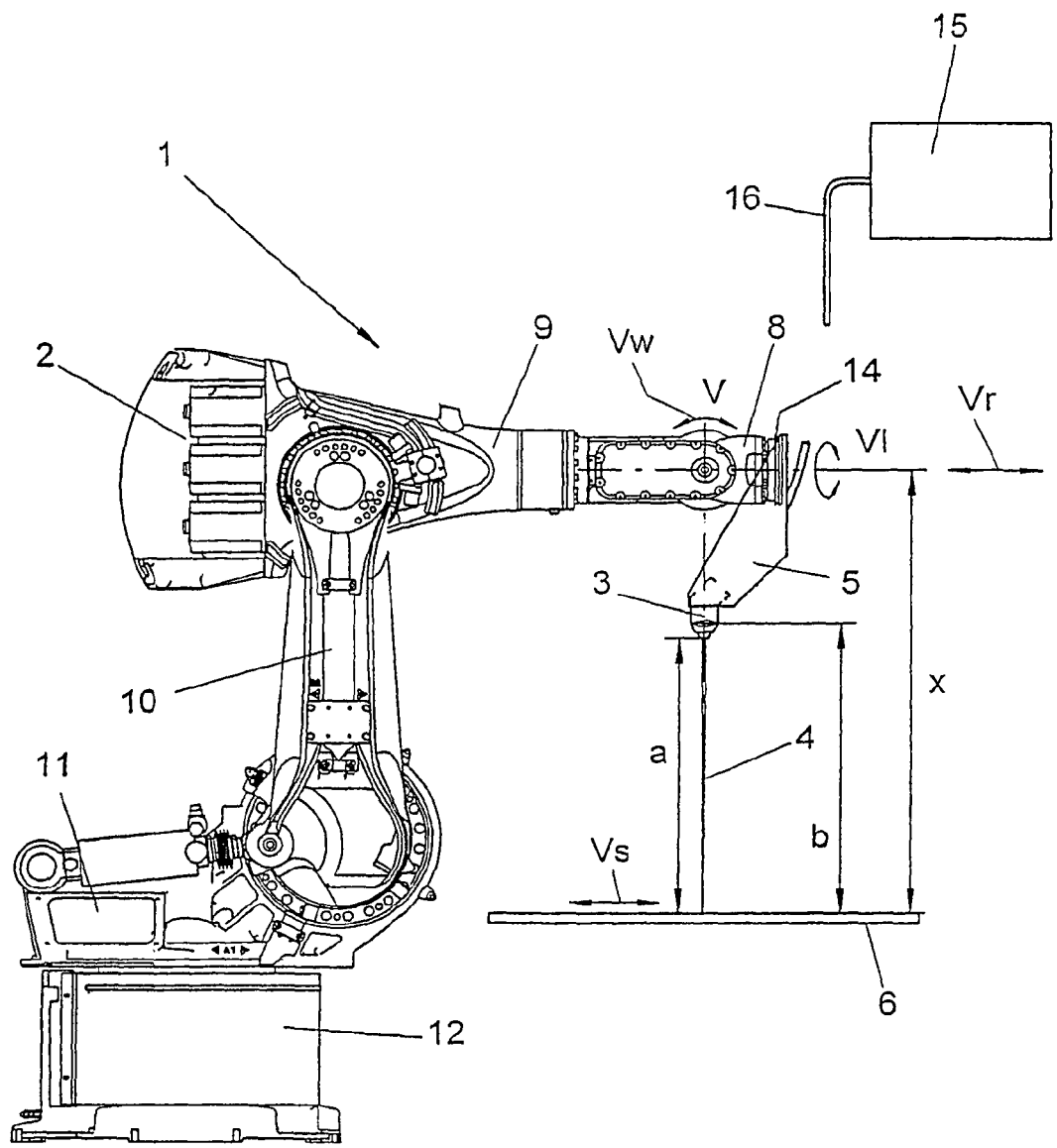
FIG. 8 is a side view of a variant of the laser machining device with a differently arranged and directed extension arm.
Figure 10:
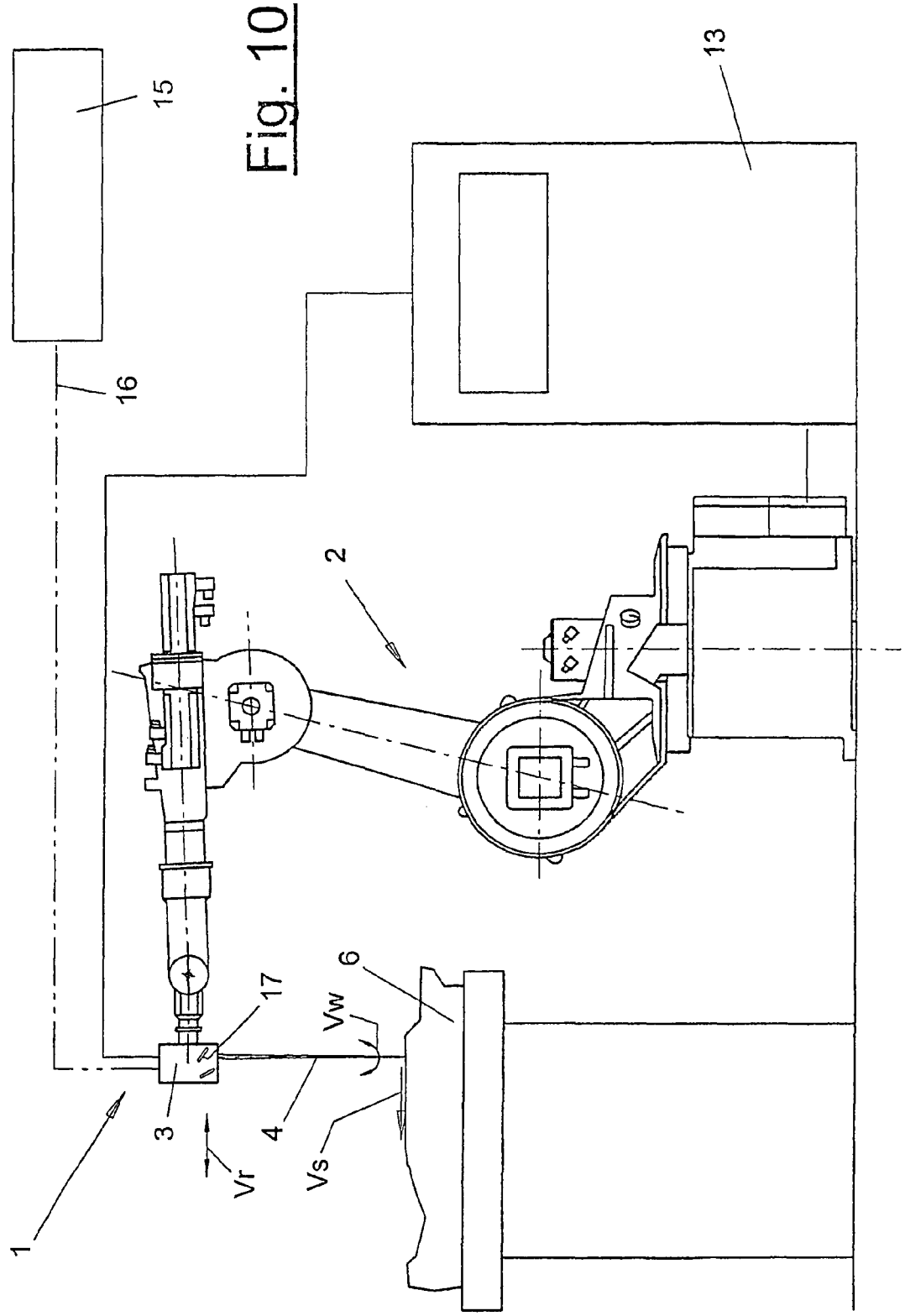
FIG. 10 is another variant of the laser machining device with a scanning means for deflecting the laser beam.

Referring to the drawings in particular, FIGS. 1, 8 and 10 show different variants of a laser machining device (1), which comprises at least one multiaxial mechanical manipulator (2) and a laser tool (3), which emits at least one laser beam (4) towards a workpiece (6).

The manipulator (2) is preferably designed as an at least six-axis articulated arm robot. In the embodiment being shown, it comprises a base (12), on which a bracket (11) is mounted rotatably about a first, vertical axis of rotation I, a rocker (10) being in turn mounted pivotably about a horizontal pivot axis II on the bracket (11). A robot arm (9) is mounted pivotably about another horizontal pivot axis III at the upper end of the rocker, and a three-axis robot hand (8) with three intersecting hand axes IV, V and VI being arranged at the front end of the robot arm (9). At the front end, the robot hand (8) has a rotatable driven flange (14), on which the laser tool (3) is mounted.

The laser tool (3) is shown only schematically in the drawings. It may be of any desired, suitable design, e.g., a YAG laser, a $CO_2$ laser, a fiber laser, a disk laser or the like. The laser light source (15) may be arranged externally, the laser beam being coupled at the laser tool (3) in a suitable manner via a line guide (16) with mirrors, optical fiber cables or the like. FIGS. 8 and 10 show such an arrangement. In a variant of the embodiment being shown, the exiting laser beam (4) may be a multipart beam and consist of a plurality of individual beams split optionally by beam splitting.

The laser tool (3) is designed, e.g., as a laser welding head. It has a laser optical system with a fixed focal distance, which may be approx. 150-400 mm, e.g., in the embodiment shown in FIGS. 1 through 4. For example, a longer, fixed focal distance of approx. 300-600 mm is used in the variant according to FIGS. 8 and 9.

Furthermore, the focal distance may vary depending on the type of the laser unit. A YAG laser typically has a focal distance of, e.g., 240 mm. The focusing optical system has a fixed angle in the variants according to FIGS. 1 through 4 as well as FIGS. 8 and 9, so that the emitted laser beam (4) is not deflected. A scanning means (17) with pivotable mirrors, with which the laser beam (4) can be deflected, is used in the third embodiment according to FIG. 10.

To compensate possible inaccuracies in focusing or positioning, the laser tool (3) may have a height compensation, with which the focusing optical system is adjusted in the direction of the beam in order to keep the focal spot and the focus on the surface of the workpiece (6). A corresponding distance-measuring means may be present for this purpose.

Figure 5:
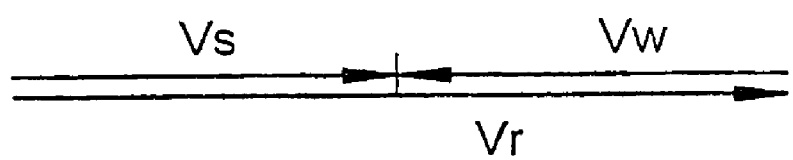
FIG. 5 is a vector diagram of the superimposed velocities.

The workpiece (6) may be of any desired type. It is preferably one or more body parts, especially bodyshell parts, of motor vehicles. FIG. 5 shows an example for this with a body side panel. The workpiece (6) may comprise a plurality of components, which are positioned in the correct position for joining and clamped by a clamping means (not shown). The workpiece (6) is preferably held stationarily, but it may alternatively also be moved in relation to the preferably stationary robot (2) or manipulator.

Figure 9:
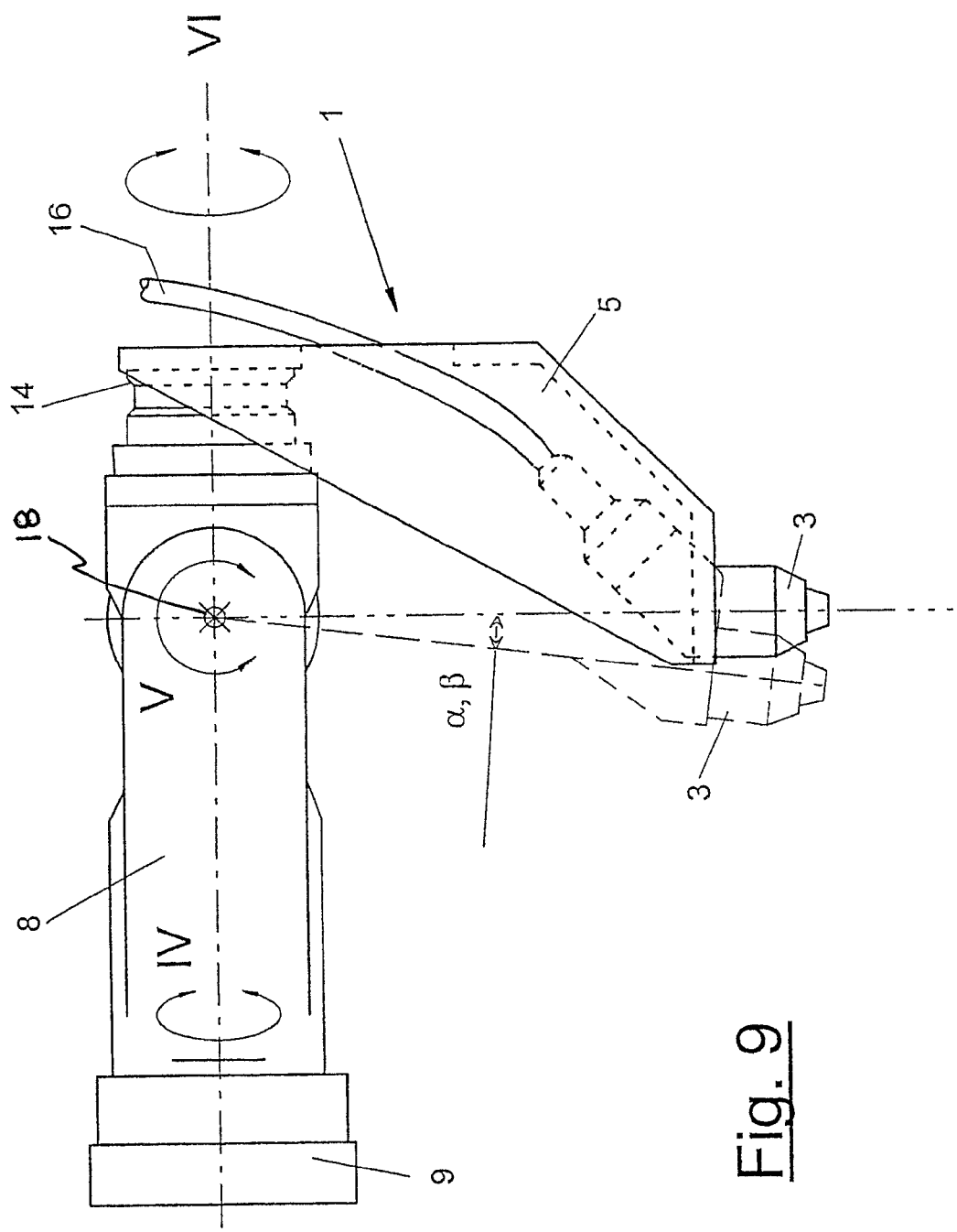
FIG. 9 is an enlarged detail view of the extension arm with the laser beam.

The laser tool (3) is arranged at a spaced location from the robot hand (8) in the variants shown in FIGS. 1 through 4 as well as FIGS. 8 and 9 and is spaced, e.g., by a corresponding extension arm (5). As an alternative, the laser tool (3) may have a correspondingly extended and optionally bent housing. In the embodiment shown in FIGS. 1 through 4, the extension arm (5) is longer than in the embodiment according to FIGS. 8 and 9, the focal distance ratios changing inversely.

Furthermore, it is possible to do away with an extension arm (5) and to arrange a laser tool (3) with a correspondingly longer focal distance of, e.g., 600-1,500 mm directly on the driven flange (14).

In the embodiment according to FIGS. 1 through 4 with a stationary workpiece (6), the laser tool (3) and the extension arm (5) are mounted flatly on the driven flange (14) of the robot hand, (8), so that the driven axis VI of the robot hand (8) and the axis in which the laser beam (4) exits coincide. As an alternative, the robot hand (8) may be rotated downwards or upwards by approx. 90° about the transverse hand axis V according to FIGS. 8 and 9, the extension arm (5) being arranged at right angles at the driven flange (14) and at right angles in relation to the driven axis VI.

There is a free working distance a between the lower or front end of the laser tool (3) and the workpiece (6). The focal distance b of the focusing optical system, which is arranged in the laser tool (3) and is not shown in greater detail, is essentially equal or somewhat greater. The tool center point coordinate (TCP coordinate) in the direction of the tool or the laser beam is designated by x. It relates to a flange system of coordinates, which is arranged preferably in the center of the driven flange (14) and is used as the reference for the displacing and compensating motions explained below as well as for the orientations of the laser beam (4) and of the laser tool (3). The TCP coordinate x is preferably the distance between the focus and the low end of the flange system of coordinates.

In all variants, the robot (2) holds the laser tool (3) at a preferably constant distance a from the workpiece (6) and guides same along a preprogrammed path, which is preferably stored in the robot control (13), along the surface of the workpiece. There preferably is no contact between the laser tool (3) and the workpiece (6). This global guide motion is called displacing motion, the robot with the robot hand (8) and especially with the driven flange (14) performing a displacement path f and at a displacement velocity Vr along the path (not shown) at the workpiece (6) due to the motion of its axes. The laser tool (3) would normally be moved and guided within the framework of this displacing motion such that the exiting laser beam (4) is directed at right angles to the surface of the workpiece.

Any greatly varying machining operations can be performed with the laser tool (3). A welding process is carried out in the preferred exemplary embodiment. The machining operations are preferably interrupted or intermittent, while, e.g., stitch seams are placed, which consist of a plurality of short seams or seam sections (7), which are placed at any distance from one another one after another in the direction of the path. FIG. 4 illustrates in the upper part such a stitch seam. During stitch seam welding, the robot (2) performs transport motions, during which the laser beam (4) is switched off, between the individual seams (7). This may be carried out in any desired and suitable manner by switching off the laser beam source, but, as an alternative, also by temporarily switching the laser beam by means of a shunt over to other laser tools. The seam lengths, seam shapes and the transport paths may vary.

An at least partially oppositely directed compensating motion of the laser beam (4) is superimposed during the welding of the stitch seam during the welding phases during which the displacing motion of the robot (2) is performed. The velocity of displacement Vr is greater here than the compensation velocity Vw directed in the opposite direction. For example, the machining or welding velocity Vs of the laser beam (4) acting on the workpiece (6) is reduced as a result and it is substantially lower than the velocity of displacement Vr. A restoring motion may take place between the welding phases in order to return the laser beam into the starting position before or at the beginning of the next welding phase.

As an alternative, the compensating velocity Vw directed in the opposite direction may be greater, at least in some areas, than the velocity of displacement Vr, which even generates a rearwardly directed machining or welding velocity Vs. As a result, it is possible, e.g., to prepare layers of scales during welding by a pendular motion of the laser beam (4), which motion is directed alternatingly forward and backward. In addition, the laser beam (4) may be deflected laterally during the compensating motion.

Figure 6:
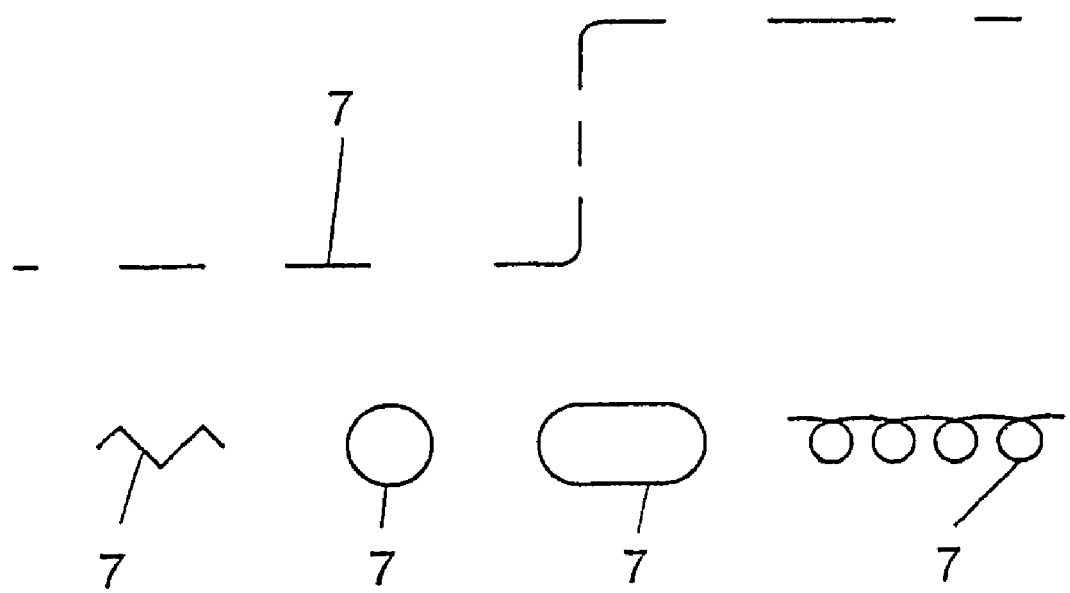
FIG. 6 is different seam shapes.

FIG. 6 shows different seam shapes that can be prepared by the technique being claimed. In the simplest and preferred embodiment variant, the stitch seam consists of individually and essentially straight or singly bent seam sections (7). This is shown in the upper part of FIG. 6. The lower part of FIG. 6 shows other variants. These may be, on the one hand, zigzag seam shapes deflected at right angles to the direction of the path. Besides these finite seam shapes, these may also be endless seam shapes, e.g., circles, ovals or spiral shapes according to FIG. 6. The preferred exemplary embodiment of stitch seams consisting of straight seam lines will be discussed in the following explanations. Corresponding modifications apply to the other seam shapes shown in FIG. 6.

The compensating motion of the laser beam (4) is preferably an angular motion, which takes place at least partially, i.e., with one motion component, in the direction of the path being followed and opposite the displacing motion. The lateral deflecting motion mentioned may be possible as well. The compensating motion of the laser beam (4) is performed in the embodiments according to FIGS. 1 through 4 and FIGS. 8 and 9 by a pivoting motion of the robot hand (8) about at least one of its hand axes IV, V, VI.

In the exemplary embodiment shown in FIG. 1 with the straight stitch seam on an upright workpiece (6), the likewise upright robot (2) performs a displacement motion Vr with its axes I through IV, which said motion is directed essentially in parallel to the workpiece (6). The compensating motion takes place by rotation of the driven flange (14), the extension arm (5) and the laser tool (3) about the transversely extending hand axis V. The arrows Vr and Vw illustrate the displacing and compensating motion. A possible lateral deflecting motion may take place, e.g., with the robot hand (8) pivoted upwardly or downwardly by 90° by a possibly superimposed rotation of the flange axis VI.

In the variant according to FIGS. 8 and 9, corresponding displacing and compensating motions are performed on a horizontal workpiece (6) by the travel motion of the robot (2) with the axes I through IV and the rotation about the hand axis V.

The hand axis responsible for the compensating motion, here the axis V, can be controlled independently from the displacing motion. This does not rule out that the hand axis in question participates in the displacing motion in order to guide the laser tool (3) along the surface of the workpiece and the desired path. However, the compensating pivoting motion can be superimposed to this axis component of the displacing motion. It is useful for this purpose if the robot control (13) permits not only angle changes related to the path but can also be programmed in both a path-related and angle-related manner.

Due to the distance x of the TCP coordinates, small angular motions about the hand axis V lead to correspondingly long paths of the laser beam (4) on the workpiece (6). The superimposed compensating motion, which is directed in the opposite direction, correspondingly leads to a reduction of the machining and welding velocity Vs on the workpiece (6).

Figure 2:
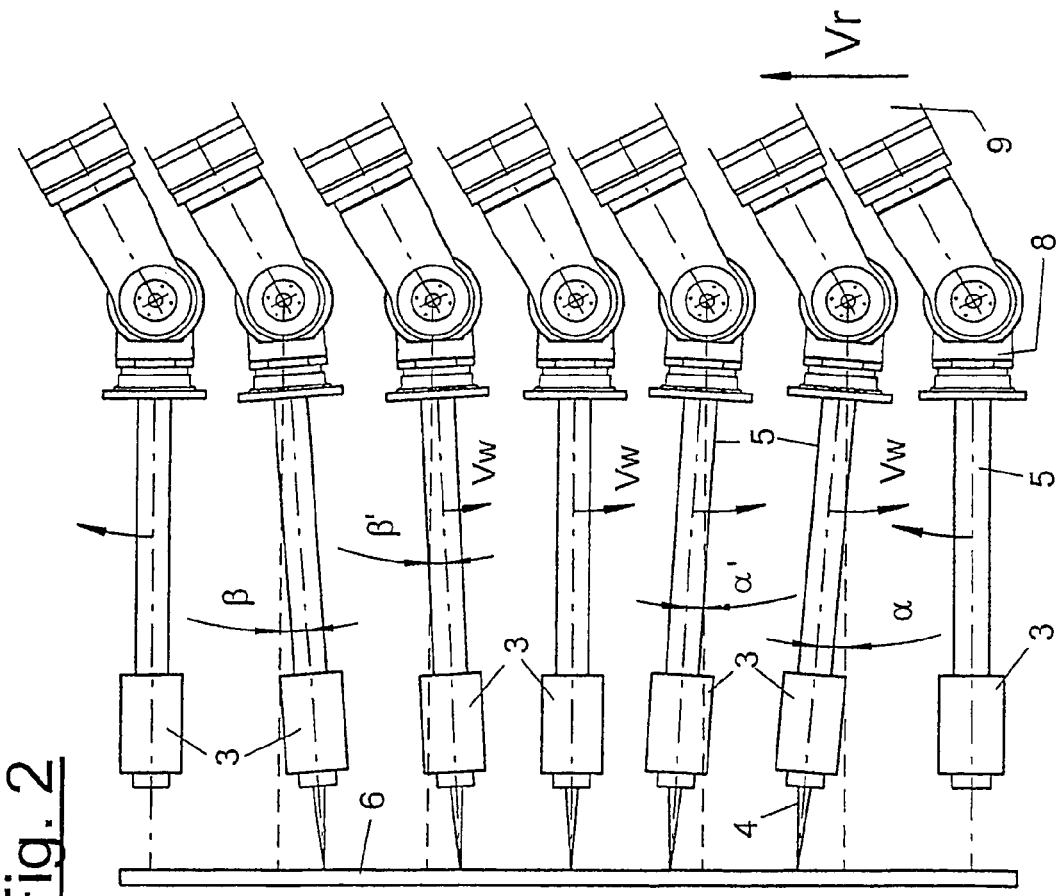
FIG. 2 is a motion process of a compensating motion of the laser tool in seven steps A-G.

FIG. 2 illustrates such a motion process during the welding of a short seam section in seven steps A through G.

Step A shows the starting position at the end of a transport phase with the laser beam (4) switched off. The laser beam axis or the orientation of the laser tool (3) and of the extension arm (5) is directed at right angles to the surface of the workpiece.

The compensating motion starts from this position, and the laser tool (3) is turned, before the beginning of welding, in the direction of the displacing motion indicated by an arrow Vr and is directed obliquely in relation to the surfaced of the workpiece. The laser beam (4), which is switched on thereafter, has a forwardly directed, oblique beam angle α, with which it reaches the surface of the workpiece (6), at the beginning of the weld seam according to Step B. At the beginning of welding, the point at which the laser beam (4) reaches the surface moves ahead of the laser tool (3) or the low end of the flange system of coordinates. This angle α has its maximum at the beginning of welding and may equal, depending on the type of the laser and other welding conditions explained in greater detail below, e.g., approx. 15° in relation to the vertical to the workpiece surface, which is drawn in broken line. Larger angles of, e.g., 60°, are also possible, depending on the application.

The beam angle α is reduced in the further course of the displacing motion due to the continuously opposite compensating motion according to arrow Vw about the hand axis V. Figure C shows this with a halved, obliquely forwardly directed beam angle α' of approx. 7.5°. The beam angle of the laser beam is perpendicular to the workpiece surface in Figure D.

An obliquely rearwardly directed beam angle β, β', which progressively increases, is generated during the further displacing motion due to the continued compensating motion Vw. The rearward beam angle β' equals approx. 7.5° in Figure E.

Figure F illustrates the end of the seam (7) and a maximum rearward beam angle β of approx. 15°. The point at which the laser beam (4) reaches the surface trails the laser tool (3) or the low end of the flange system of coordinates.

The laser beam (4) is switched off at the end of the seam, and the laser tool (3) is subsequently turned in the direction of the displacing motion in a restoring motion during the transport phase and is directed at right angles to the workpiece surface. Figure G illustrates this position, which is also the starting position A for the next seam section and the next welding phase.

The compensating motion preferably takes place symmetrically to the seam section (7), so that the absolute values of the respective beam angles α, α', β, β' directed forward and backward are approximately equal. The restoring motion may likewise be uniform. The velocity of displacement Vr is preferably constant during welding. The compensating velocity Vw is preferably constant as well. A constant welding velocity Vs is obtained due to the superimposition. However, the size ratios and the relative ratios of the compensating and displacing motions and the respective velocities Vw and Vr thereof may vary if needed, and the velocity of welding, Vs, changes as well.

Due to the rotating compensating motion, the focal point describes an arc. For compensating, either the robot (2) with its axes I through V may perform an arc-shaped displacing motion directly correspondingly in the opposite direction, so that the focal point always remains at a constant position in relation to the workpiece surface. The focal point may be on or just below the workpiece surface. As an alternative, compensation of the arc-shaped motion and a shift of focus, which is normally associated with it, may take place due to the above-mentioned height adjustment of the focusing means.

Figure 3:
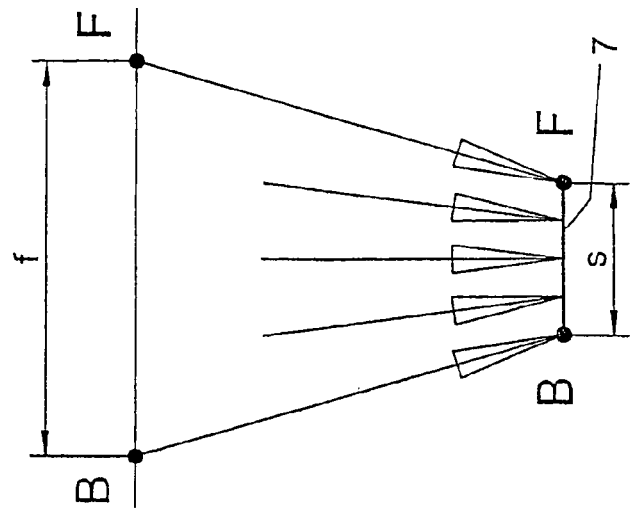
FIG. 3 is a path view of the weld seam and the equivalent path.

As is illustrated in FIG. 3, the traveled path of displacement f of the flange system of coordinates is substantially greater during welding than the welding path or the seam length s.

FIG. 4 illustrates the quantitative velocity ratios in a diagram, where seam sections (7) of the stitch seam and the forwardly and rearwardly directed beam angles occurring in the process are shown schematically in the top part.

FIG. 5 shows the superimposition of the velocity vectors Vr, Vw and Vs, taking into account the value and the direction thereof for the example of a straight stitch seam according to FIGS. 1 through 4.

During the welding and transport phases, the robot (2) may travel at a constant velocity of displacement Vr, as it is indicated by a solid line in FIG. 4. An exactly oppositely directed equalizing velocity Vw of the focus on the workpiece surface, which is, e.g., likewise constant and half the velocity of displacement Vr, is generated by the compensating motion. Due to the superimposition of the two velocities Vr and Vw directed in opposite directions according to FIG. 5, a welding velocity Vs of 5 m/minute is obtained, which corresponds, e.g., to the maximum possible process velocity. Other and higher welding and machining velocities can also be attained with laser tools (3) of improved quality or in other machining processes.

In a variant of the conditions shown in FIG. 4, the velocity of displacement Vr and the compensating velocity Vw may not be constant and may be variable during the welding phase. This is necessary, e.g., to make it possible to prepare the different seam shapes shown in FIG. 6.

The velocity of displacement Vr corresponds to the velocity of welding Vs in a conventional welding process. Thanks to the compensating motion and the increase in the distance x, the velocity of displacement Vr can be substantially increased, e.g., to threefold, compared to the state of the art. In a variant of the above-described embodiment, it is also possible now to further increase the velocity of displacement Vr during the transport phases, which is illustrated by broken lines in FIG. 4.

Figure 7:
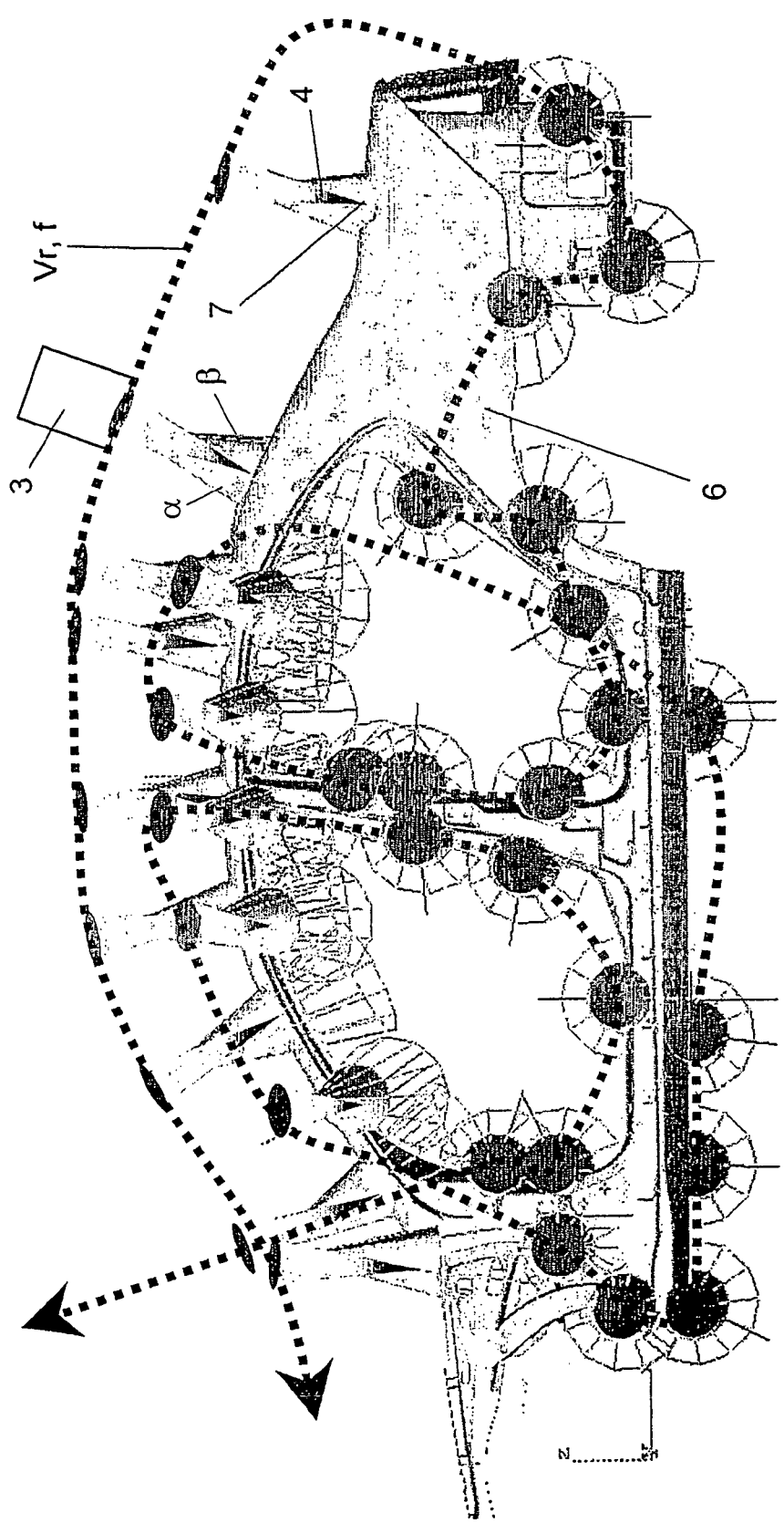
FIG. 7 is a welding diagram on a body side panel.

Due to the overall increase in the velocity level of the velocity of displacement Vr, the welding robot can cover the distances between the weld seam sections much more rapidly than before and place more weld seams or seam sections than before during the same time. FIG. 7 illustrates, e.g., such a process during the welding of a side panel of a vehicle body in a single rotary motion. All seam sections are prepared here by a single welding robot (2) according to FIG. 1 in a circular path with a plurality of motion loops which may intersect each other.

The vehicle body is quasi "sewn" with one or more stitch seams (7). The stitch seam (7) placed with optimal welding velocity and maximum output ensures high strength of the connection of the components that is appropriate for the stresses and can replace the hitherto separate tacking and the subsequent deposit welding and combine them in one welding operation in one station. The amount of heat introduced into the vehicle body is also limited by the stitching and the seam interruptions.

It is favorable for "sewing" to use a laser tool (3) with a high average or continuous wave output CW and high beam quality, e.g., a fiber laser. The seam shape can also be selected and set in a suitable manner in order to obtain the desired strength appropriate for the stress. The laser tool (3) preferably has a pulse frequency that is variable but can preferably be set at a fixed value and maintained at a constant value during the process. The on and off times during the welding can be controlled and varied. The output of the laser tool (3) can be switched and modulated. It preferably has a frequency generator for this purpose, with which the pulse frequency and the output of the laser can be controlled and adapted to the materials of the components, the seam lengths and seam shapes. Furthermore, the laser beam may also be switched on and off for the stitch seam (7) with the transport and welding phases at the necessary frequency.

The possible weld seam lengths depend, among other things, on the TCP distance x. The greater this distance x, the greater is the maximum seam length s.

Moreover, the weld seam length s may also depend on the ratio of the velocity of displacement Vr to the maximum velocity of welding Vs. The smaller the differences between Vr and Vs, the greater may be the weld seam length s. Conversely, short seam lengths s make it possible to substantially increase the velocity of displacement Vr and consequently the overall output of the process.

The seam lengths s depend, on the other hand, on the maximum possible oblique beam angles α, β. These beam angles may vary depending on the material of the components and the type or the output of the laser tool (3). The greater these beam angles α, β, the greater the seam length s can be.

In case of a corresponding focal distance x, the practically useful velocities of displacement Vr of the robot may be approx. 50 m/minute or higher at a welding velocity Vs of, e.g., 6 m/minute. The seam lengths s that are useful in practice are, e.g., in the range of 5 mm to 50 mm.

FIGS. 8 and 9 show the variant mentioned in the introduction with the angular position of the extension arm (5) and of the laser tool (3). The extension arm (5) is fastened with a base plate to the driven flange (14) and projects obliquely rearwardly, so that the laser tool (3) mounted at the front end of the extension arm is offset rearwardly and downwardly in relation to the driven flange (14). The laser tool (3) is directed now such that the extension of the emitted laser beam (4) intersects the transversely located hand axis V at an intersection (18). This intersection (18) is preferably also the center of intersection of all three axes IV, V and VI.

In this embodiment, the TCP coordinate x is the distance between the intersection (18) and the focal point on the workpiece surface (6). The robot (2) performs the displacement motion by a motion of its axes I-IV. The compensating motion takes place by a rotation of the robot hand (8), the extension arm (5) and the laser tool (3) about the hand axis V. The forwardly and rearwardly directed beam angles α and β described in the exemplary embodiment shown in FIG. 2 also develop now.

In the variant according to FIGS. 8 and 9, the extension arm (5) is shorter than in the first exemplary embodiment according to FIGS. 1-4. Depending on the desired working distance a, the focal distance b of the laser optical system may be equal to or greater than in the first exemplary embodiment.

FIG. 10 illustrates the third variant, which was likewise mentioned above, in which the deflection of the laser beam (4) and the compensating motion are performed by a mobile scanning means (17). An extension arm (5) may be done away with in this case. The scanning means (17) is designed, e.g., as a scanner optical system with two or more rotatingly movable mirrors, whose motion can be controlled from the robot control (13). Due to the rotations of the mirrors, the laser beam (4) can be deflected in one or two axes. The scanning means (17) is preferably accommodated in the housing of the laser tool (3), but it may alternatively also be arranged externally. The focusing optical system preferably has a fixed focal distance in this case as well.

Various modifications of the embodiments shown are possible. The position and the design of the workpiece (6) may vary, and the robot (2) varies its orientation accordingly. As a result, it is also possible to process three-dimensional paths and seams, as in the case of the body (6) shown in FIG. 7. The robot (2) now changes its orientation preferably such that only one and preferably the same hand axis will always be responsible for the compensating motion.

It is possible in another variant to perform the compensating motion alternatively by a plurality of hand axes or by an attached rotating and/or linear unit. The rotating and/or linear unit will then move the laser tool (3) for the compensating motion independently from the robot hand (8). An extension arm (5) may possibly be done away with in this case.

Furthermore, there are possibilities of variation in the case of the laser optical system, which may have, e.g., a variable focal distance. The laser optical system may otherwise be of any desired design.

The embodiment of the manipulator (2) is also variable. In the simplest case, it may be a carriage device with a plurality of translatory axes, e.g., an x-y carriage. Mixed forms of rotatory and translatory axes and other numbers of axes and degrees of freedom are possible as well.

Moreover, the type of the laser processes is also variable. This pertains, besides to welding, e.g., to cutting, surface machining, e.g., engraving, or specific surface heating.

While specific embodiments of the invention have been shown and described in detail to illustrate the application of the principles of the invention, it will be understood that the invention may be embodied otherwise without departing from such principles.

The invention claimed is:

1. A process for machining workpieces with a moving laser beam, the process comprising:
    holding a laser tool, that emits the laser beam, by a multi-axial mechanical manipulator at a manipulator hand at a spaced location above the workpiece;
    moving the laser tool along a predetermined path along the workpiece by a displacing motion of the manipulator and during the displacing motion of the manipulator;
    superimposing a compensating motion of the laser beam to the displacing motion during the displacing motion with the compensating motion being at least partially oppositely directed to the displacing motion wherein the compensating motion of the laser beam is performed by a pivoting motion of the manipulator hand about a hand axis; and
    continuously displacing the laser tool with the displacing motion of the manipulator during an intermittent machining of the workpiece in which machining phases and transport phases alternate.

2. A process in accordance with claim 1, wherein during intermittent machining, the point at which the laser beam reaches the surface gets ahead of the laser tool or the low end of a flange system of coordinates at the beginning of a machining phase and trails it at the end of the machining phase.

3. A process in accordance with claim 1, wherein an at least partially transversely directed compensating motion of the laser beam is further superimposed to the displacing motion during the machining operation.

4. A process in accordance with claim 1, wherein a velocity of displacement Vr of the displacing motion of the manipulator displacing the laser tool is greater than an oppositely directed compensating velocity Vw of the compensating motion.

5. A process in accordance with claim 1, wherein a velocity of displacing motion Vr of the manipulator displacing the laser tool is greater than a machining velocity Vs of the laser beam at the workpiece.

6. A process in accordance with claim 1, wherein the laser tool is held by means of a extension arm at a spaced location from the manipulator hand.

7. A process in accordance with claim 1, wherein the laser beam is directed toward the workpiece at the beginning of each machining phase with an obliquely forwardly directed beam angle α α'.

8. A process in accordance with claim 1, wherein the laser beam is directed toward the workpiece at the end of each machining phase with an obliquely rearwardly directed beam angle β, β'.

9. A process in accordance with claim 1, wherein the manipulator performs an essentially constant displacing motion during the machining.

10. A process in accordance with claim 1, wherein the manipulator performs an essentially constant or accelerated displacing motion during the transport phases between the machinings.

11. A process in accordance with claim 1, wherein:
    the manipulator performs an essentially constant displacing motion during the machining; and
    the manipulator performs an essentially constant or accelerated displacing motion during the transport phases between the machinings.

12. A device for machining workpieces with a moving laser beam, the device comprising:
- a multiaxial mechanical manipulator;
- a manipulator hand having at least one hand axis, the manipulator hand being connected to the multiaxial mechanical manipulator for pivoting relative to the multiaxial mechanical manipulator about the at least one hand axis;
- a laser tool held by the manipulator hand;
- a control for controlling said multiaxial mechanical manipulator, for controlling said manipulator hand for movement about the at least one said hand axis controlled independently from a displacing motion of the multiaxial manipulator and for for controlling said laser tool, said multiaxial mechanical manipulator being controlled for moving the laser tool along the predetermined path along the workpiece by the displacing motion of the manipulator the manipulator hand being controlled for generating a compensating motion of the laser beam, which said motion takes place during the machining operation and is directed opposite to the displacing motion and is superimposed to the displacing motion and includes superimposing the at least partially oppositely directed compensating motion of the laser beam to the displacing motion during the machining operation wherein the compensating motion of the laser beam is performed by a pivoting motion of the manipulator hand about the at least one said hand axis, said laser tool being controlled to provide intermittent machining and each of the multiaxial mechanical manipulator the manipulator hand and the laser tool being controlled for continuously displacing the laser tool with the displacing motion during intermittent machining of the workpiece with the displacing motion and the at least partially oppositely directed compensating motion in which machining phases and transport phases alternate.

13. A device in accordance with claim 12, wherein the laser tool is mounted on the manipulator hand by means of an extension arm that creates a distance.

14. A device in accordance with claim 12, wherein the laser tool has a focusing optical system for generating a fixed-angle laser beam.

15. A device in accordance with claim 12, wherein the laser tool has a fixed focal distance.

16. A device in accordance with claim 12, wherein the laser tool has a focal distance of approx. 150 mm to 400 mm.

17. A device in accordance with claim 12, wherein the laser tool comprises a welding tool.

18. A process for machining said workpieces with a moving laser beam, the process comprising:
- providing a multiaxial mechanical manipulator with a connected manipulator hand having at least one hand axis, the manipulator hand being connected to the multiaxial mechanical manipulator for pivoting relative to the multiaxial mechanical manipulator about the at least one hand axis;
- holding a laser tool at the manipulator hand and maintaining the laser at a spaced location above the workpiece;
- moving the laser tool along a predetermined path along the workpiece by a displacing motion of the manipulator and during the displacing motion of the manipulator to provide a displacing motion velocity of the moving laser tool relative to the workpiece;
- superimposing a compensating motion of the laser beam to the displacing motion during the displacing motion with the compensating motion being at least partially oppositely directed to the displacing motion wherein the compensating motion of the laser beam is performed by a pivoting motion of the manipulator hand about one hand axis providing machining with the laser machining location moving at a machining velocity; and
- machining the workpiece with the laser tool machining the workpiece at the machining velocity while regulating the displacing motion of the manipulator such that the displacing motion velocity is greater than the machining velocity of the laser beam at the workpiece during machining of the workpiece.

19. A process in accordance with claim 18, wherein the workpiece is machined intermittently, while machining phases and transport phases alternate, wherein during intermittent machining the laser tool is continuously displaced with a continuous displacing motion of the manipulator.

20. A process in accordance with claim 18, the displacing motion velocity is greater than an oppositely directed compensating velocity of the compensating motion.

21. A process in accordance with claim 18, wherein:
- the laser beam is directed toward the workpiece at the beginning of machining with an obliquely forwardly directed beam angle $\alpha$ $\alpha'$; and
- the laser beam is directed toward the workpiece at the end of the machining with an obliquely rearwardly directed beam angle $\beta$, $\beta'$.

22. A device for machining workpieces with a moving laser beam, the device comprising:
- a multiaxial mechanical manipulator;
- a manipulator hand having at least one hand axis, the manipulator hand being connected to the multiaxial mechanical manipulator for pivoting relative to the multiaxial mechanical manipulator about the at least one hand axis;
- a laser tool held by the manipulator hand; and
- a control for controlling said multiaxial mechanical manipulator for moving the laser tool along a predetermined path along the workpiece by a displacing motion of the multiaxial manipulator to provide a displacing motion velocity of the moving laser tool relative to the workpiece and controlling said manipulator hand independently from the displacing motion for superimposing a compensating motion of the laser beam to the displacing motion during the displacing motion with the compensating motion being at least partially oppositely directed to the displacing motion wherein the compensating motion of the laser beam is performed by a pivoting motion of the manipulator hand about one hand axis providing control of machining movement with the laser machining location of the laser beam moving at a machining velocity with the displacing motion velocity greater than the machining velocity of the laser beam at the workpiece during machining of the workpiece.

23. A device in accordance with claim 22, wherein the laser tool is mounted on the manipulator hand by means of an extension arm that creates a distance.

* * * * *